United States Patent [19]

van Deursen

[11] 4,369,675

[45] Jan. 25, 1983

[54] METHOD AND APPARATUS FOR CONTROLLING AN INFINITELY VARIABLE TRANSMISSION OF A MOTOR VEHICLE

[75] Inventor: Petrus H. van Deursen, Deurne, Netherlands

[73] Assignee: Van Doorne's Transmissie B.V., Tilburg, Netherlands

[21] Appl. No.: 329,827

[22] Filed: Dec. 11, 1981

Related U.S. Application Data

[63] Continuation of Ser. No. 92,732, Nov. 9, 1979, abandoned.

[30] Foreign Application Priority Data

Nov. 13, 1978 [NL] Netherlands ............... 7811192

[51] Int. Cl.³ ............... B60K 41/12; F16H 11/06
[52] U.S. Cl. ............... 74/864; 74/868; 474/18; 474/28
[58] Field of Search .......... 74/843, 856, 861, 862, 74/863, 864, 865, 867, 868; 474/18, 28

[56] References Cited

U.S. PATENT DOCUMENTS

| | | | |
|---|---|---|---|
| 3,115,049 | 11/1961 | Moan | 74/868 |
| 3,195,368 | 7/1965 | Boudewijn | 74/863 |
| 3,368,426 | 2/1968 | Karig | 74/865 |
| 3,596,528 | 8/1971 | Dittrich | 74/865 |
| 3,600,960 | 8/1971 | Karig | 474/18 |
| 3,600,961 | 8/1971 | Rattunde | 74/867 |
| 3,893,344 | 7/1975 | Dantlgraber | 74/867 |
| 3,918,312 | 11/1975 | Espenschied | 74/867 |
| 3,941,016 | 3/1976 | Will | 74/868 |
| 4,161,894 | 7/1979 | Gircosa | 74/863 |
| 4,187,742 | 2/1980 | Achard | 74/863 |

FOREIGN PATENT DOCUMENTS

| | | | |
|---|---|---|---|
| 599669 | 6/1960 | Canada | 74/867 |
| 1655558 | 5/1973 | Fed. Rep. of Germany | 74/864 |
| 1232550 | 4/1960 | France | 74/864 |
| 52-4964 | 1/1977 | Japan | 74/856 |
| 366458 | 2/1963 | Switzerland | 74/863 |
| 377595 | 6/1964 | Switzerland | 74/843 |
| 878850 | 10/1961 | United Kingdom | 74/865 |
| 989227 | 4/1965 | United Kingdom | 74/863 |
| 1194148 | 6/1970 | United Kingdom | 74/865 |
| 1525674 | 9/1978 | United Kingdom . | |

Primary Examiner—Rodney H. Bonck
Assistant Examiner—Dirk Wright
Attorney, Agent, or Firm—Cushman, Darby & Cushman

[57] ABSTRACT

In apparatus for controlling the transmission ratio of an infinitely variable V-belt transmission having variable pitch input and output pulleys operable by hydraulic cylinders, each pulley being formed of a pair of conical discs, at least one of which is axially movable relative to the other disc of that pair and the input pulley being driven by a power source: a hydraulic control valve for operating the cylinders, the valve having an internal axially movable spool; a device responsive to the speed of the input pulley for urging the spool in one direction; a compression spring urging the spool in an opposite direction, the spring being loaded through an intermediate connecting assembly by an external loading device; and a regulating device connected to the intermediate connecting assembly, the regulating device being responsive to an operating variable of the transmission.

5 Claims, 5 Drawing Figures

METHOD AND APPARATUS FOR CONTROLLING AN INFINITELY VARIABLE TRANSMISSION OF A MOTOR VEHICLE

This is a continuation of application Ser. No. 92,732 filed Nov. 9, 1979, now abandoned.

This invention relates to a method and apparatus for controlling the ratio of an infinitely variable transmission for a motor vehicle in response to certain selected variables of the system.

BACKGROUND OF THE INVENTION

It is inherent in an engine and transmission system that changing the ratio of the transmission while the engine is operating causes the engine to change its speed, the magnitude of the change depending in part on other variables such as the position of the engine throttle. The present invention is particularly concerned with infinitely variable transmission systems which are controlled during operation of the motor vehicle in a manner such that the engine will operate at a desired speed, to the extent permitted by the range of ratios available for the particular transmission. A transmission system of this type is disclosed in British Pat. No. 1,525,674, and the present invention is an improvement over the general type disclosed therein.

The infinitely variable transmission described in British Pat. No. 1,525,674 is of the kind which includes an endless belt or chain running over a primary and a secondary V-shaped pulley, each pulley being constructed of two conical discs, one conical disc of the primary pulley being fixed to the transmission input shaft and one conical disc of the second pulley being fixed to the transmission output shaft. The other conical disc of each pulley is axially adjustable toward and away from the respective shaft-connected disc so that the running diameters of the pulleys can be changed in order to change the ratio of the transmission. Adjustment of the two axial positions of the axially movable discs is effected simultaneously by hydraulic means in a manner such that movement of the disc of the secondary pulley compensates for movement of the primary pulley disc. The control device for the pulleys includes a hydraulic spool valve which controls the supply and exhaust of pressure fluid to the hydraulic actuator for the axially movable disc of the primary pulley. The axially movable spool of the valve is biased in one direction by a fluid pressure which, through a Pitot tube, is built up in proportion to the speed of the transmission input shaft, i.e. in proportion to engine speed. The spool is biased in the opposite direction by a compression spring which in turn is biased in proportion to, for example engine intake manifold pressure or the position of the engine throttle. The control system operates in a mode such that the transmission ratio of the transmission is adjusted so that the engine speed assumes a given value, depending e.g. on the position of the throttle and, of course, to the extent permitted by the range of ratios available within the particular transmission.

In order to improve the driveability, in particular the reaction of a vehicle with an infinitely variable transmission considerable research has been carried out and various proposals have been made, such as the incorporation of certain delays in the control system and the influencing the transmission ratio by motor torque or tractive force.

SUMMARY OF THE INVENTION

It is an object of the invention to improve the driveability of a motor vehicle having an infinitely variable transmission of the type which is controlled in response to variables in the overall system so as to result in a given transmission input speed (i.e. a given engine speed). According to the invention improved driveability is obtained by controlling the transmission partly in accordance with the actual prevailing transmission ratio in a mode such that at a smaller transmission ratio (i.e. a higher gear) and at otherwise constant parameters of the system the transmission input speed (i.e. engine speed) is increased.

By causing the magnitude of the (required) engine speed to be influenced partly by the actual transmission ratio, there is obtained the effect that upon acceleration or deceleration of the vehicle, at otherwise constant parameters (position throttle pedal and/or position throttle valve or inlet manifold pressure etc.) the engine speed increases or decreases, respectively. Although the evaluation of the driveability of a motor vehicle is subjective, the effect of this influence on the engine speed by the actual transmission ratio appears usually to be experienced favorably.

Another advantage of the above described influencing is the fact that when opening the throttle, from a situation wherein the vehicle is driven smoothly, the shift down at a higher vehicle speed takes place earlier than at a lower vehicle speed. This is the case when initially the vehicle is driven in a situation wherein the engine speed is minimal, which for instance will be the case when driving at a constant speed between about 15 and 65 km per hour. The required driving power is then so small that the engine speed can be and will be minimal (e.g. 2200 rev. per minute). If the throttle is further opened in such situation, i.e. more motor power is desired for acceleration, the engine speed will increase (i.e. there will be a shift down) if the opening of the throttle takes place to a sufficient degree, i.e. to a new position of the throttle pedal at which the engine speed that is larger than said minimal one. This shifting down is done on account of the desired, higher engine speed, which desired engine speed, with the control according to the present invention, will be larger at a "higher gear" than at a "lower gear". When driving with minimal engine speed, a higher gear will mean a greater vehicle speed, and a higher desired engine speed will mean earlier shift down. At a greater vehicle speed, consequently, shift down takes place earlier at a given degree of opening the throttle, which is a desired effect, since for a given acceleration at a greater vehicle speed, a larger motor power is required.

In itself a higher engine speed, with a stationary position of the throttle pedal (or throttle valve), results in an increase in the motor output.

Another additional advantage of the above described influencing of the engine speed is the fact that the driver, with a stationary position of the throttle pedal, can hear from the sound of the engine whether the vehicle speed is constant or not, viz. in a manner corresponding to that with a motor vehicle having a stepped gearing. It had been found that this is a rather important aspect of driving comfort.

Furthermore according to the invention, when braking by the engine, the desired engine speed may be chosen in dependence on the actual transmission ratio. In such a method the extra influencing of the (desired)

engine speed to be set remains limited to certain situations wherein such a control offers special advantages, in particular when braking the engine, e.g. when driving downhill for a prolonged period. In this respect it is advantageous that not only the engine speed is increased by a special intervention, whether or not in an adjustable degree, but a transmission ratio-depending engine speed offers special advantages. When the vehicle, at too low braking power of the engine, is increasing its speed when driving downhill (whereby during maintenance of the engine speed, shift up will take place) it is advantageous when the braking power of the engine is automatically increased by increase of the engine speed.

Furthermore, in a method wherein the output speed of the transmission is measured, according to the invention the desired engine speed may also be influenced by this measuring value. When driving the vehicle as a matter of fact, at any given engine speed, the speed of the output or secondary shaft of the transmission (as well as the vehicle speed which is proportional thereto) is a measure for the actual transmission ratio. Consequently, this value, with a control whereby the engine speed already exerts influence, may contain sufficient information for the transmission ratio-dependent adjustment of the engine speed.

The measurement of the speeds may be effected electronically, mechanically as well as hydraulically in otherwise known manner.

In a transmission having a variable belt drive transmission with pulleys provided with mutually movable, substantially conical sheaves, according to the invention, the required engine speed can be influenced by the axial position of one of the sheaves, which is a direct measure for the actual transmission ratio.

According to another feature of the invention, the influencing of the desired engine speed may be substantially inversely proportional to the transmission ratio.

A simple and usable control is obtained when, according to still another feature of the invention, the engine speed is controlled in dependence on both the position of the throttle pedal (throttle valve) and the actual transmission ratio.

The invention furthermore relates to a device for controlling the transmission ratio or an infinitely variable transmission of a motor vehicle, provided with control means for adjusting the transmission ratio to result in a desired engine speed, which device is characterized in that the control means are influenced by the actual transmission ratio, in the sense that at a smaller transmission ratio ("higher gear") the engine speed is increased. Such a control device improves the driveability of the motor vehicle and moreover has other advantages, as already described.

The device may be provided with sensor means for measuring the output speed of the transmission, whereby according to a feature of the invention the transmission ratio control means are influenced by the measured speed value.

In a device for controlling the transmission ratio of a variable belt drive transmission with pulleys provided with mutually axially movable, substantially conical sheaves, according to the invention, the control means may be influenced by the axial position of one of the sheaves, which is a proper measure for the actual transmission ratio.

In a control device of the present type, the transmission ratio may be adjustable by means of a hydraulic spool valve the spool of which is movable under the influence of the difference between the desired and the actual engine speed. According to a feature of the invention, in such a device the position of the spool can be influenced by the actual transmission ratio.

The spool may thereby loaded in one direction at one end by a force proportional to the engine speed and is loaded in the opposite direction the other end by a compression spring whose compression is proportional to the axial position of an actuation member abutting against the spring, whereby according to the invention the position of the actuation member can partly be influenced by the actual transmission ratio.

According to still another feature of the invention, the above mentioned actuation member may be displaceable by a lever, which on the one end is displaceable by a cam whose position depends on e.g. the position of the throttle pedal (or throttle valve) and which on the other end is displaceable depending on the actual transmission ratio.

In a device for controlling the transmission ratio of a variable belt drive transmission with pulleys provided with mutually axially displaceable, substantially conical sheaves, furthermore provided with a sensor for signalling the axial position of one of the sheaves, the above mentioned lever may be also displaceable through the sensor.

In order to be able, if desired, to reduce vehicle speed by using the engine as a brake, the device provided with means for displacing the valve spool actuation member according to the invention, may be characterized by means which can be put into operation for separately displacing the actuation member depending on the actual transmission ratio for obtaining an increased engine speed.

According to the invention the means for displacing the valve spool actuation member may comprise a rotary cam, and the means which can be put into operation may comprise a member rotatable coaxially with said cam depending on the desired degree of engine speed increase, said member being connected to one end of a lever which contacts the actuation member, which lever is displaceable on the other end by a sensor which measures the actual transmission ratio.

BRIEF DESCRIPTION OF THE DRAWINGS

A number of embodiments of the control device according to the invention will now be explained, by way of example, with reference to the accompanying drawings.

In the Figures corresponding parts are shown with identical reference numerals.

DETAILED DESCRIPTION

Figure 1:
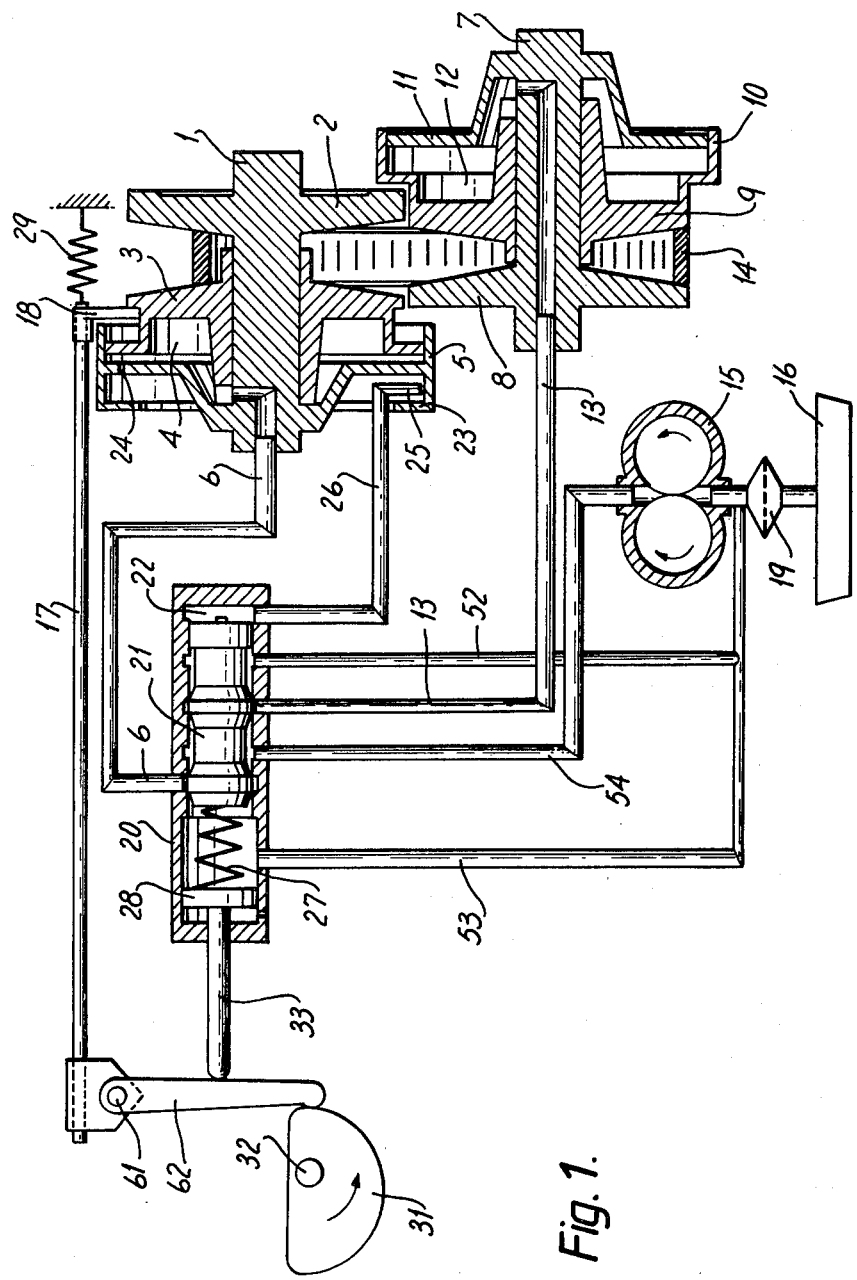
FIG. 1 is a schematic view of a transmission system embodying the principles of the present invention.

The various embodiments shown diagrammatically in the Figures comprise a primary or input shaft 1, fitted with a stationary conical disc or sheave 2 and an axially displaceable conical disc or sheave 3, which together form a primary pulley. The sheave 3 forms the piston of a cylinder 5 and may be axially displaced by supplying and discharging pressure fluid to the cylinder space 4 via line 6. Furthermore, there is disposed a secondary or output shaft 7, likewise fitted with a stationary conical sheave 8 and an axially displaceable conical sheave 9, which together form a secondary pulley. The sheave 9 is integral with a hollow cylindrical portion which forms a cylinder 10 wherein is disposed a piston 11 fixedly connected to the output shaft 7, so that a cylinder space 12 is enclosed. Fluid may be supplied and discharged to and from the cylinder space 12 via a line 13. Looped over the primary and second pulleys is a V-shaped driving belt 14, which may be e.g. a reinforced or non-reinforced synthetic driving belt or a metal driving belt. By axially displacing the conical sheaves 3 and 9, the running diameters of the driving belt 14 about the two pulleys may be so changed that the difference in rotation speed of the shafts 1 and 7 can be varied infinitely. The fluid pressures in cylinder spaces 4 and 12 ensure that the required tension is present in the driving belt 14.

In addition, the various embodiments are provided with a fluid pump 15 for drawing in and pressurizing fluid from a reservoir 16 via a filter 19. Although otherwise many types of pumps may be applied, the pump in the embodiments according to FIGS. 1 and 5 should not provide a given volume but a specific pressure, if desired depending on certain parameters.

For sensing the transmission ratio, there is disposed a rod 17 which carries at one end a sensor shoe 18 which rests against the axially displaceable sheave 3, under the load of a tension spring 29. The rod 17 shifts in axial direction with movement of the sheave 3 and accordingly the axial position of the rod 17 is a measure of the transmission ratio.

The transmission ratio of the infinitely variable transmission (shafts, pulleys and driving belt) is controlled through a valve 20 having an internal axially displaceable spool 21. The spool 21 is loaded on one end by the fluid pressure in a space 22, which fluid pressure depends on the primary or input speed of the shaft 1. For sensing the speed of the shaft 1 there is disposed on the cylinder 5 a radially outwardly closed annular groove 23, which via opening 24 in the cylinder 25 is filled with fluid from the cylinder space 4. The filling may naturally also take place from outside via a separate fluid supply line. By means of a Pitot tube 25 the fluid rotating with the primary shaft 1 in the groove 23 is converted into a fluid pressure which via line 26 is transmitted to the space 22 wherein the fluid pressure is thus dependent on the speed of the primary shaft 1.

On the other end the spool 21 is loaded by the compression of a compression spring 27, which is biased toward the right by means of an axially movable actuation member 28 in the form of a piston residing in the chamber of the valve 20.

A shift of the spool 21 to the left results in a flow of fluid to the cylinder space 4 of the primary pulley 2, 3 so that the transmission changes into higher gear (that is, to a lower transmission ratio), i.e. the running diameter of the driving belt on the primary pulley 2, 3 increases and that on the secondary pulley 8, 9 decreases accordingly. A shift of the spool 21 to the right on the other hand produces accordingly a change into a lower gear.

Referring now in detail to the FIG. 1 embodiment the fluid pressurized by the pump 15 is conducted via line 54 to valve 20. Depending on the position of the spool 21 the fluid pressure of line 54 is conducted either via the line 6 to the cylinder space 4, or via the line 13 to the cylinder space 12. In the first case the fluid in the cylinder space 12 can flow out via the line 13 and then through the valve 20 to line 52. In the second case the valve 20 connects the lines 6 and 53 so that the fluid can flow from cylinder space 4 to the low pressure side of pump 15. In the stationary condition the spool 21 will occupy an equilibrium position, wherein the measured input speed (fluid pressure in space 22) corresponds with the desired input speed (the compression of spring 27).

In order to axially displace the actuation member 28, it is provided with a cam follower 33 projecting from the valve 20 and resting against a displaceable arm 62. The arm 62 is rotatably connected at one end through a pivot 61 to the rod 17. The other end of the arm 62 rests against a cam 31 which is rotatable about a pivot 32. The cam 31 may be mechanically connected to the throttle pedal or throttle valve of the motor vehicle, so that the rotation position of cam 31 depends on the position of the throttle pedal or the position of throttle valve. Also, the position of the cam 31 may be set in dependence on the inlet manifold pressure or another parameter or combination of parameters, whether or not electronically processed to a command for the rotation of cam 31. In the embodiment shown in FIG. 1 the axial position of actuation member 28 consequently depends on both the actual transmission ratio (i.e. the axial position of the rod 17) and the rotation position of the cam 31. As a result for each rotation position of the cam 31, the compression force of the spring 27 is controlled by the actual transmission ratio, viz. in the sense that at a smaller transmission ratio (i.e. "a higher gear"), at which the rod 17 has been displaced to the right, a larger fluid pressure is required in the space 22 in order to bring the spool 21 to equilibrium. This increased fluid pressure in the space 22 corresponds with an increased rotation speed of the shaft 1, i.e. an increased engine speed of the vehicle.

It will be clear that thus, at a stationary position of the cam 31, the engine speed of the vehicle increases during shifting up of the transmission to a higher gear.

Figure 2:
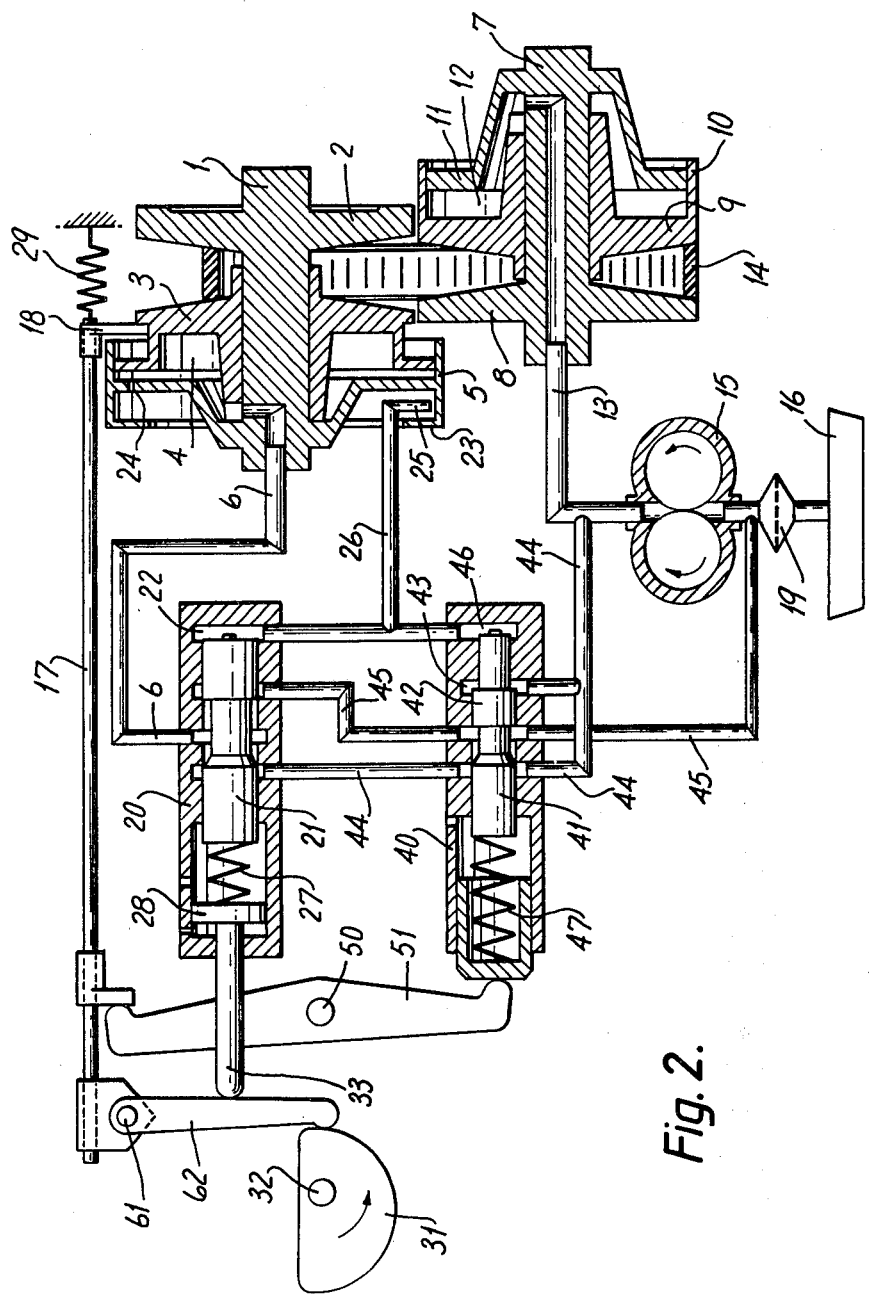
FIG. 2 is a schematic view of a second embodiment of a transmission system.
Figure 3:
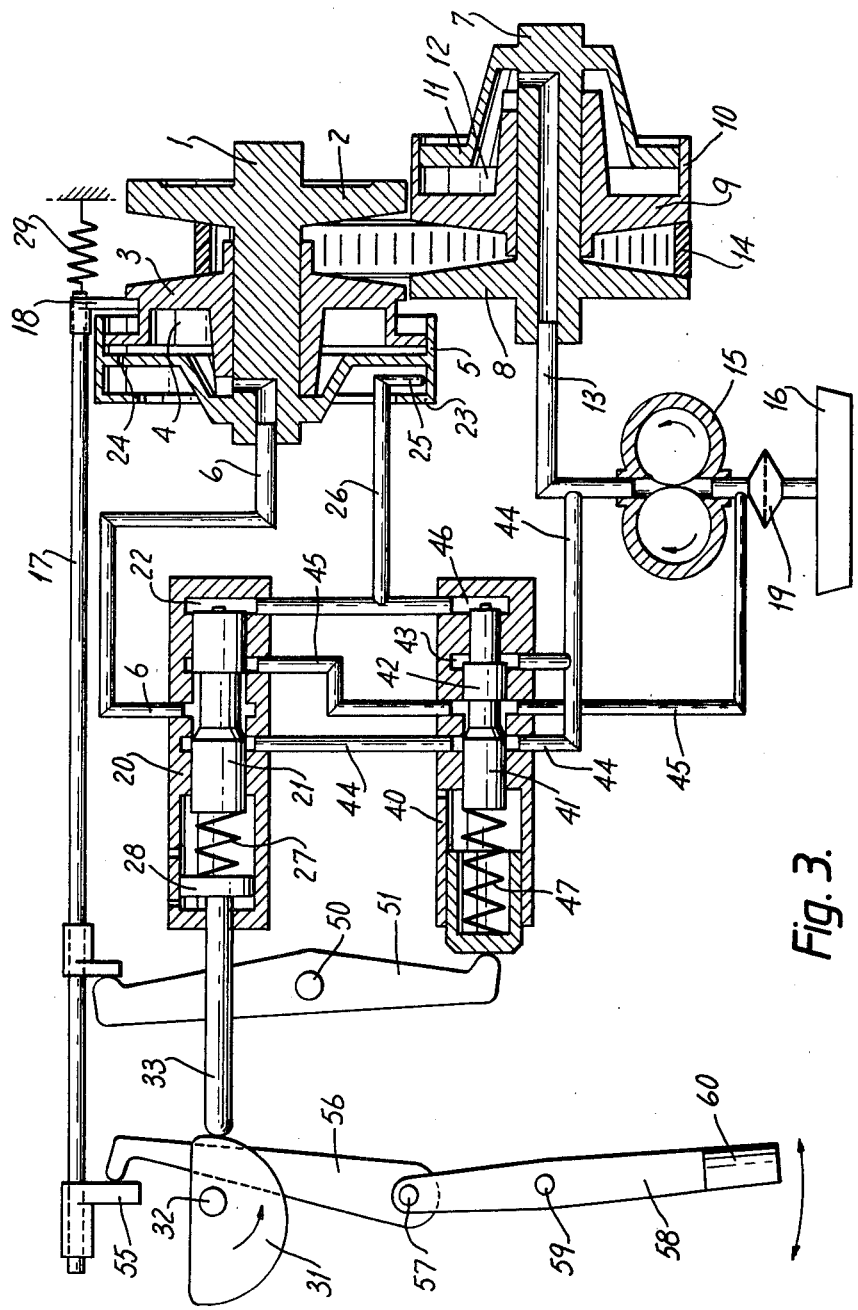
FIGS. 3 and 4 are schematic views of a third embodiment, wherein the transmission ratio-dependent control can be put into operation separately, and FIG. is a schematic view of a fourth embodiment that slightly differs from that of FIGS. 3 and 4.
Figure 4:
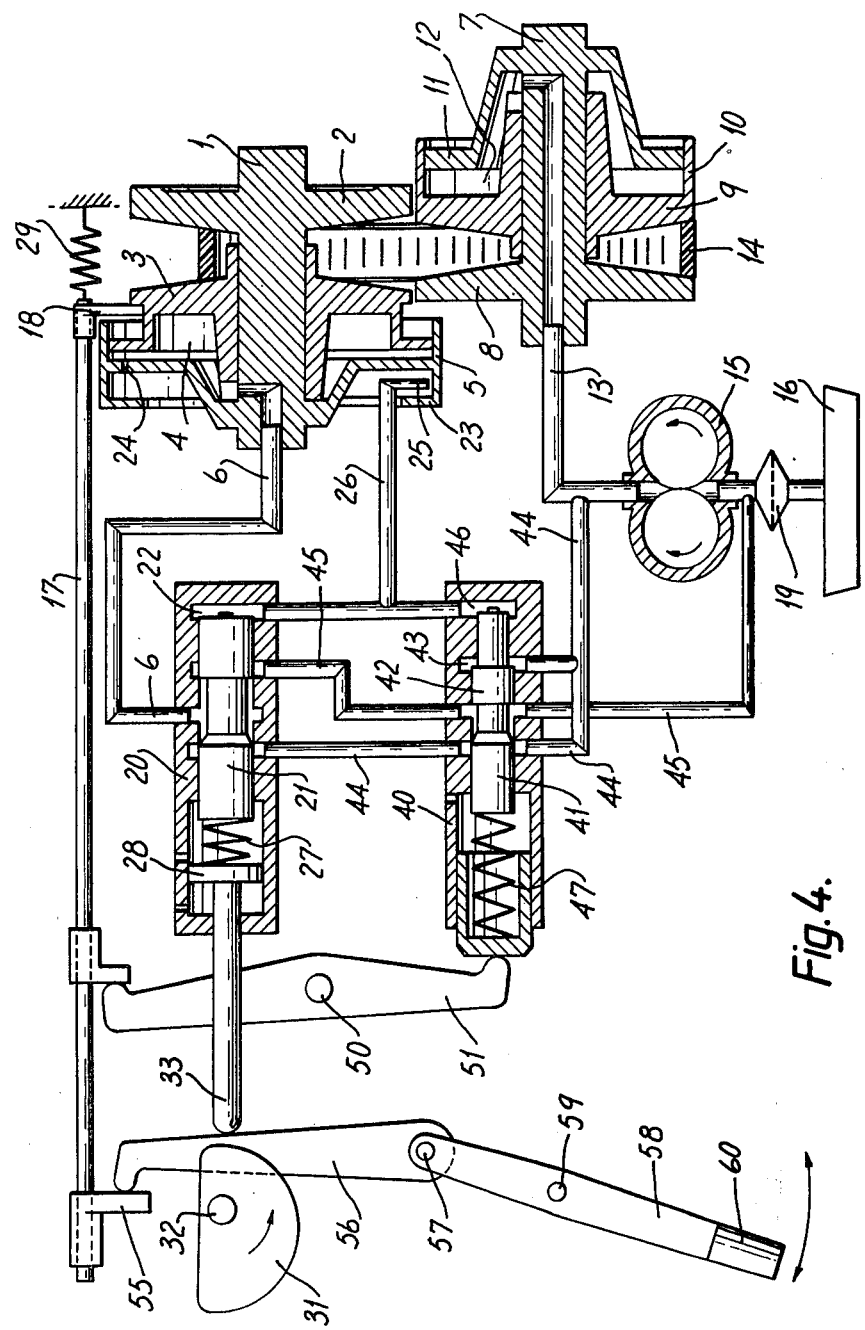

In the embodiments shown in FIGS. 2, 3 and 4 there is present an overflow valve 40 for controlling the fluid pressure pressurized by the pump 15, which fluid pressure is also present in the cylinder space 12. The valve 40 is fitted internally with an axially displaceable spool 41. The spool 41 includes an enlarged portion 42 which is in contact with the fluid supplied by pump 15 in a space 43. Upon an increase in pump pressure the spool 41 will be displaced to the left. At sufficient displacement of the spool 41, the fluid in line 44 can flow back via line 45 to the lower pressure side of pump 15.

The spool 41, which thus controls the fluid pressure pressurized by pump 15, is also influenced by the fluid pressure in a valve space 46 depending on the input speed of the shaft 1, and by the force of a compression spring 47. The spring 47 is biased toward the right by the rod 17 via a lever 51 which is mounted for swinging movement about a fixed pivot 50. One end of the lever 51 presses against the spring 47 and the other end rests against a stop fixed to the rod 17. The amount of bias applied to the spring 47 depends on the prevailing transmission ratio. It will be clear that thus the tension in the driving belt 14 is regulated through the fluid pressure in the cylinder space 12, viz. depending on input speed and transmission ratio. However, it is also possible to control the belt tension in accordance with other parameters, e.g. the torque to be transmitted. The hydraulic control principle of the embodiments shown in FIGS. 2, 3 and 4 is further described in British Pat. No. 1,525,674.

In the embodiments shown in FIGS. 2, 3 and 4, the transmission ratio is set in that the valve spool 21 connects either lines 44 and 6 (displacement of the spool 21 to the left) so that the fluid pressurized by the pump 15 can flow via lines 44 and 6 to the primary cylinder space 4, or connects lines 6 and 45 (displacement of the valve spool 21 to the right) so that fluid can flow from the cylinder space 4 via lines 6 and 45 to the low pressure side of the pump 15. For the displacement of the conical sheave 3 of the primary pulley it is naturally required that the effective surface of cylinder-piston unit 3, 5 is larger than that of cylinder-piston unit 10, 11, so that at equal fluid pressure in both cylinder spaces, 4 and 12, the force on the conical sheave 3 is larger than that on the conical sheave 9. In a stationary condition (non-variable transmission ratio) the valve spool 21 will be in an equilibrium condition, wherein the fluid pressure in line 6 is lower than that in line 44.

As in the embodiment shown in FIG. 1, in the embodiments of FIGS. 2, 3 and 4, a shift of the valve spool 21 to the left results in flow of fluid to the cylinder space 4 so that the transmission is shifted to a higher gear (that is, to a lower transmission ratio), i.e. the running diameter of the driving belt 14 on the primary pulley 2, 3 increases and the running diameter of the secondary pulley 8, 9 decreases correspondingly. A shift of the spool 21 to the right on the other hand results in a corresponding shift to a lower gear.

The axial displacement of the actuation member 28 in the embodiment shown in FIG. 2 is effected in the same manner as in the embodiment shown in FIG. 1, i.e. depending on the axial displacement of the rod 17 (depending on the actual transmission ratio) and depending on the rotation position of the cam 31.

In the embodiment of FIGS. 3 and 4 the actual ratio-dependent engine speed may be put into operation separately. To this end, there is disposed beside the rotatable cam 31 an arm 56 one end of which can be displaced by a stop 55 mounted on the rod 17. The other end of the arm 56 can be displaced by an actuation lever 58 to which the arm 56 is pivoted at 57. Actuation member 28 may be displaced by the cam 31 (FIG. 3) or by the arm 56 (FIG. 4), as described below.

In the first case (FIG. 3) the arm 56 is beyond reach of the cam follower 33, so that the axial position of the actuation member 28 depends only on the rotation position of the cam 31, which e.g. is defined by the position of the throttle pedal of the motor vehicle. The engine speed of the vehicle is consequently defined only by the position of cam 31, i.e. dependent only on the position of the throttle pedal.

By moving a hand grip 60 on the actuation lever 58 to the left, the lever 58 rotates about a fixed pivot 59 and the pivot point 57 of the arm 56 is thereby moved to the right. As a result there is produced the relationship as shown in FIG. 4, wherein the actuation member 28 is displaced, independently of the position of the cam 31, by the arm 56, which rests against the cam follower 33 and the stop 55. The engine speed is thereby controlled only depending on the actual transmission ratio.

This may be of relevance in particular when, for instance during driving downhill, braking on the engine have to take place, in which case it is desirable that the engine speed, independently of the position of the throttle pedal, can be increased. The engine speed is then on the one end depending on the position of actuation lever 58 and on the other end depending on the prevailing transmission ratio (axial position of rod 17). Naturally, the lever 58 may be put in any required position.

As clearly shown in FIG. 4, upon sufficient rotation of the cam 31, depending on the position of the lever 58, the cam follower 33 will come into contact with the cam 31, whereby the displacement of the actuation member 28 again depends on the rotation of cam 31.

In the embodiment shown in FIGS. 3 and 4, consequently, an engine speed depending on the actual transmission ratio can be put in operation, whereby the extent of speed increase of the engine is adjustable. However, if on account e.g. of the position of the throttle pedal, a higher engine speed is required, a further shift-down will take place through rotation of cam 31.

Figure 5:
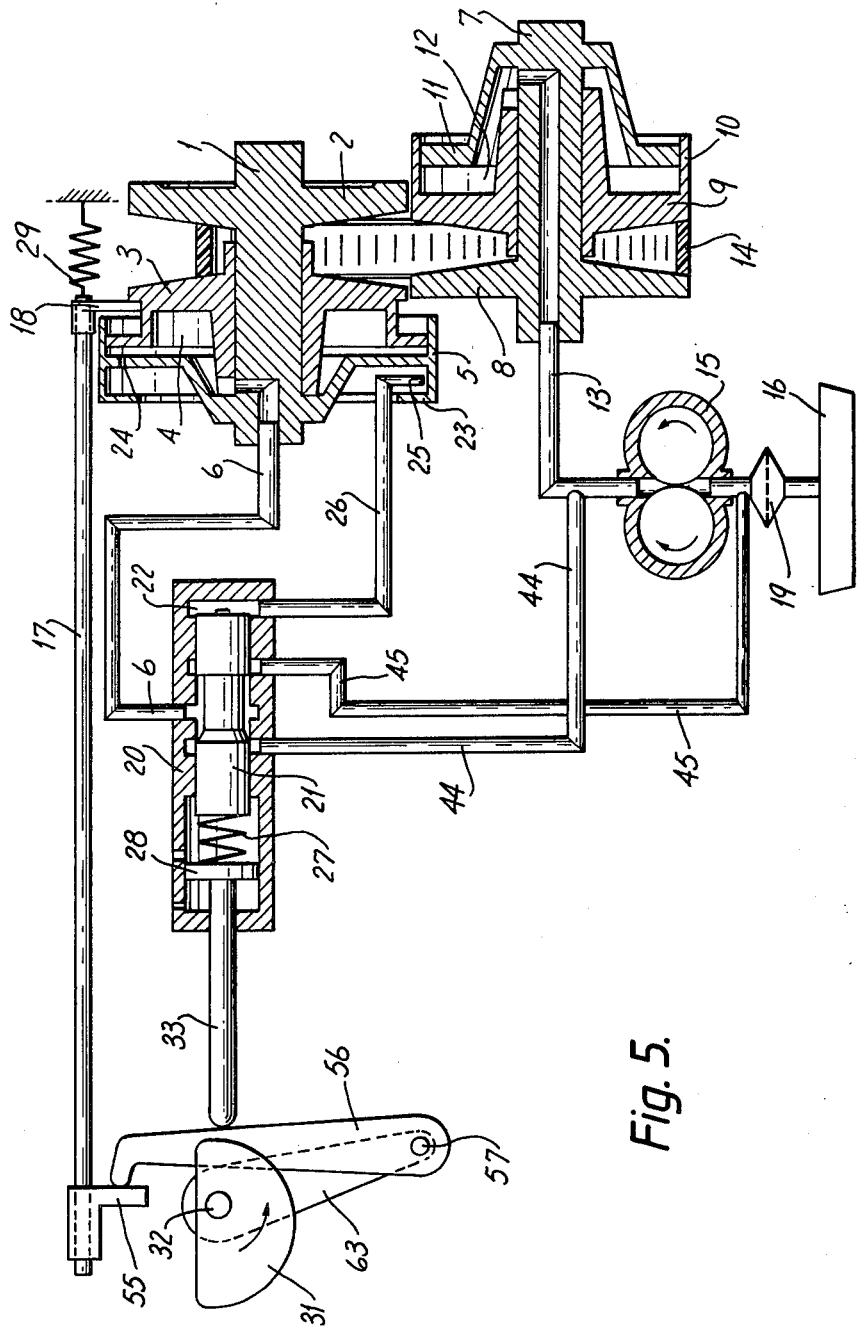

FIG. 5 shows an embodiment wherein the overflow valve 40 according to FIGS. 2, 3 and 4 is not present. The tension in the driving belt 14 therefore depends on the pressurizing of pump 15, which pressure prevails in the cylinder space 12. Furthermore, the hydraulic control functions similarly as that according to FIGS. 2, 3 and 4.

In FIG. 5 one end of the arm 56 abuts the stop 55 carried by the rod 17 and the other end is connected through a pivot point 57 to a member 63 rotatable about a fixed pivot 32. The difference from the embodiment shown in FIGS. 3 and 4 is the manner in which the pivot point 57 is displaced; the operation is otherwise identical. That the rotation of the cam 31 and of the member 63 is effected through two axial shafts may offer constructive advantages.

It is also possible in the embodiment shown in FIG. 5 to pivotally attach the arm 56 to the rod 17 and to design the member 63 as a cam against which the member 56 rests. Such cam may be shaped so that a specific relation is created between the rotation of the cam about point 32 and the influencing of the arm 56 (both as regards the place where the arm 56 touches the cam and the extent of displacement of the arm 56).

In addition to the above described embodiments, many other embodiments of the invention are possible.

Furthermore, the Figures of the embodiments do not represent the required fluid lines for possible lubrication and the like of the driving belt and other parts, nor are possible restrictions shown in the fluid lines which, if desired, may be provided.

What is claimed is:

1. In apparatus for controlling the transmission ratio of an infinitely variable V-belt transmission having variable pitch input and output pulleys operable by hydraulic cylinders, each pulley being formed of a pair of conical discs, at least one of which is axially movable relative to the other disc of that pair and said input pulley being rotatably driven by a power source: a hydraulic control valve for operating said cylinders, said valve having an internal axially movable spool; means responsive to the speed of said input pulley for urging said spool in one direction; compression spring means urging said spool in an opposite direction, said spring means being loaded through intermediate connecting means movable by external loading means and additionally movable by additional loading means dependent on the actual transmission ratio.

2. Apparatus as in claim 1 including transmission ratio pick-up means and wherein said additional loading means is responsive to said pick-up means.

3. Apparatus as in claim 2 wherein said transmission ratio pick-up means includes a member biased against and movable with one of the axially movable pulley discs.

4. Apparatus as in any one of claims 1, 2 or 3 wherein said external loading means includes a rotatable cam and wherein said intermediate connecting means includes a cam follower which is displaceable by said cam and which is displaceable by a lever, said lever being movable by said additional loading means.

5. In a motor vehicle system having an infinitely variable transmission which includes an endless member running over primary and secondary pulleys each formed of a pair of conical discs at least one of which is axially movable relative to the other disc of that pair and said primary pulley being driven by motor vehicle engine: apparatus for controlling the transmission ratio of said transmission comprising: hydraulic cylinders for moving an axial movable disc of each pulley; a hydraulic valve for operating said cylinders, said valve having an internal axially movable spool the axial position of which determines the transmission ratio of said transmission; means responsive to engine speed applying an axial force to said spool in one opposite direction; a compression spring applying a biasing force to said spool in an opposite direction, the biasing force being varied by axially movable actuating means engaging said spring; and control means responsive to an operating variable of the engine and to the actual transmission ratio of said transmission for controlling the position of said actuating means in a mode to increase and decrease the biasing force of said compression spring in accordance with the actual transmission ratio during at least a portion of the range of operation of said control means.

* * * * *